United States Patent

[11] 3,544,767

| [72] | Inventor | Peter Lauck, III<br>Princeton, New Jersey |
|---|---|---|
| [21] | Appl. No. | 810,948 |
| [22] | Filed | March 27, 1969 |
| [45] | Patented | Dec. 1, 1970 |
| [73] | Assignee | J. P. Stevens & Co., Inc.<br>a corporation of Delaware. by direct and mesne assignments. |

[54] HEATING CONTROL CIRCUIT WITH SCR-UNIJUNCTION TRANSISTOR COMBINATION
15 Claims, 2 Drawing Figs.

| [52] | U.S. Cl. | 219/501 |
|---|---|---|
| [51] | Int. Cl. | H05 1/02 |
| [50] | Field of Search | 219/494, 501, 505, 504 |

[56] References Cited
UNITED STATES PATENTS

| 3,373,262 | 3/1968 | Howell | 219/501 |
|---|---|---|---|
| 3,385,957 | 5/1968 | Munson et al. | 219/501 |
| 3,428,785 | 2/1969 | Welch | 219/501 |

*Primary Examiner*—Bernard A. Gilheany
*Assistant Examiner*—F. E. Bell
*Attorney*—Semmes & Semmes ABSTRACT: A half-wave electronic control circuit for a flexible heating device having an electronic switch that comprises a single silicon controlled rectifier (SCR) triggered by a unijunction transistor circuit connected at its gate. Temperature control means comprising variable resistance, a capacitor, and a thermistor, control the amount of heat developed by the heating device.

INVENTOR
PETER LAUCK, III

BY *Semmes and Semmes*

ATTORNEYS

3,544,767

HEATING CONTROL CIRCUIT WITH SCR-UNIJUNCTION TRANSISTOR COMBINATION

BACKGROUND OF THE INVENTION

1. Field of the Invention

The invention has particular use in applications such as electric blankets and other electrically heated fabrics, such as drapes, floor coverings and the like.

2. Description of the Prior Art.

The prior art discloses the utilization of flexible blanket and sheet heating devices in which activation of the heating element comprises a bimetallic switch or thermostat. The temperature responsive element is normally a mechanical bimetallic element mounted in a central box that is physically separated from the heating element. It regulates to the ambient or room temperature rather than to the area selected to be heated. Therefore, constant accurate control of the temperature in the area selected to be heated is difficult to achieve. Also such mechanical bimetallic switches are subject to metal fatigue, as well as arcing and pitting of contacts. Such imperfect methods have been employed as the standard approach to heating devices and the electric blanket industry in particular for two decades. Further, such temperature responsive elements are normally slow acting and large in size, and consume a relatively large amount of power.

The prior art further disclosed a silicon controlled rectifier (SCR) that may be connected in the control circuit associated with the heating device which is conductive in one direction, and is fired by transistor trigger circuits to selectively activate the heating element.

Such related inventions include Peter Lauck, III U.S. Pat. Nos. 3,385,958, issued May 28, 1968 entitled Electric Blanket; 3,422,244, issued Jan. 14, 1969 entitled Electric Blanket with a Temperature Responsive Control Circuit; 3,427,792, issued Apr. 8, 1969 entitled Electric Heating Device with Temperature Responsive Control and SCR Manual 4th Edition of General Electric Company, reference FIG. 9.10. The instant circuit is distinct from Lauck patents aforesaid since the present circuit employs a single unijunction transistor controlling an SCR as opposed to the direct controlling of a triac as for example in U.S. Pat. No. 3,427,792, and no transistor triggering device as in the U.S. Pat. No. 3,422,244. Here the circuit employs unijunction transistor triggering control for the SCR which in turn controls the load circuit. Distinguishing over the GE reference above the present invention involves to advantage a half-wave circuit in the control of a single SCR triggered by a unijunction transistor in combination with a temperature circuit. and a capacitor and variable resistor.

Disclosure for this patent application dates to at least Jan. 29, 1967.

SUMMARY OF THE INVENTION

The present invention is directed to a particular type of unijunction transistor trigger circuit for an SCR to optimize the performance of the control circuit for a heating device. In brief the control circuit employs an SCR connected in series with the load such as the heating element of a blanket. Since a single SCR is employed, the circuit is operable only on a half-wave basis. The SCR is controlled by a unijunction transistor. The unijunction transistor conducts and delivers an output pulse when the capacitor in the emitter circuit is charged to a value corresponding to the firing voltage of the transistor. The point at which the capacitor is sufficiently charged is determined by a variable resistor $R_2$ in series with the capacitor and a temperature sensor which is connected in parallel with the capacitor C. "Temperature sensor" by definition evaluates the temperatures and balances and regulates the electronics. It has either a positive or negative temperature coefficient, which used in conjunction with other variable resistors and/or capacitors, critically effects the triggering or timing of the SCR circuit.

DETAILED DESCRIPTION OF THE INVENTION

Figure 1:
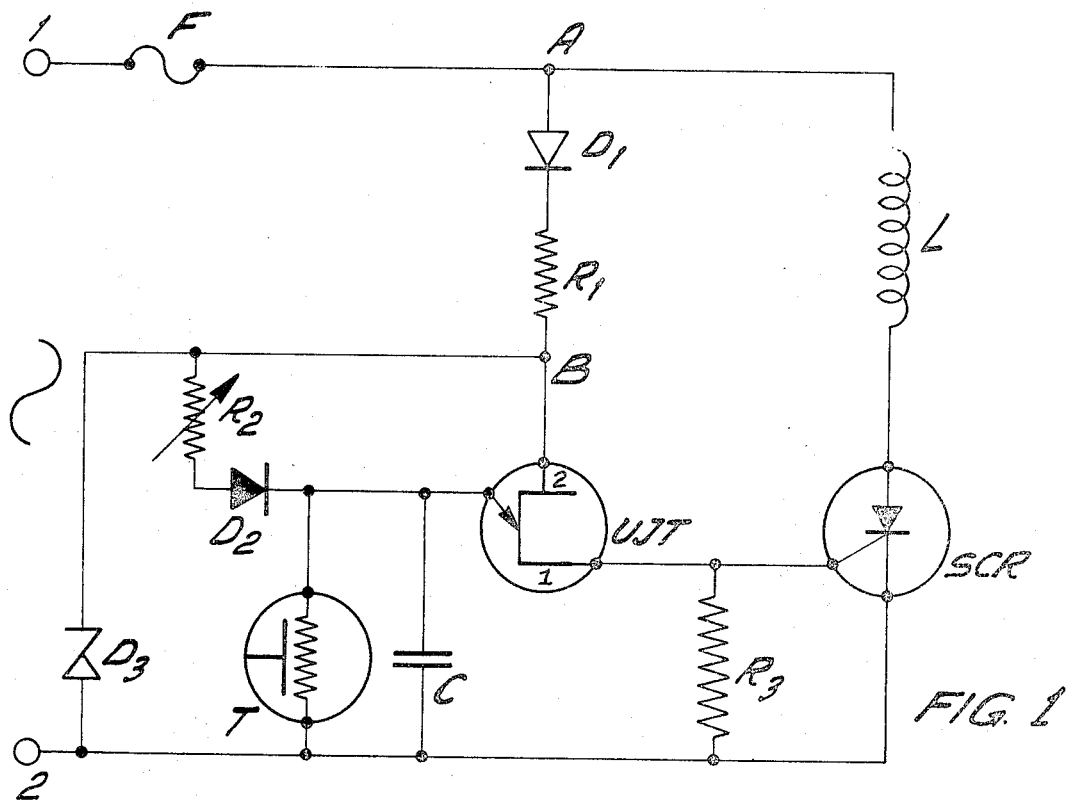

In FIG. 1, temperature sensor T has negative temperature coefficient, and the relative values of resistors $R_1$ and $R_2$, sensor T, and capacitor C are chosen to control the duty cycle of the SCR, depending upon the selected temperature to which the heating device is set by variable resistor $R_2$, and the actual temperature of the area controlled by the heating device which affects the temperature of sensor T.

Figure 2:
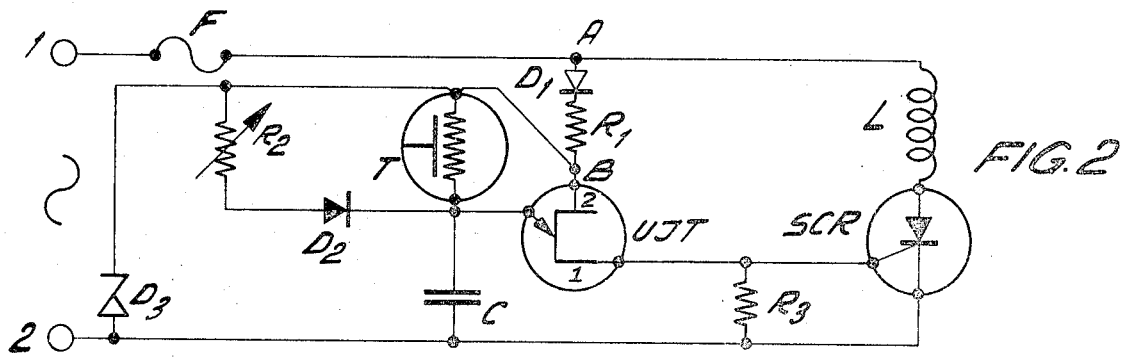

In FIG. 2, a positive temperature coefficient sensor varies the triggering circuit mode slightly. It connects from point B and the top of $R_2$ in series with the top of capacitor C, making it in parallel with variable resistance $R_2$. This demands a sensor with positive temperature coefficient that modifies the timing device slightly. The rest of the circuitry remains unchanged as described and shown in FIG. 1.

The FIGS. show the heat control circuit according to the invention. FIG. 1 shows conventional alternating current power supply applied between input terminals 1 and 2. The series connection of diode $D_1$ and resistor $R_1$ is interconnected to circuit points A and B. A safety fuse F is preferably interposed between terminal 1 and circuit point A. Zener diode $D_3$ is connected between circuit point B and input terminal 2. Additionally, the series connection of variable resistor $R_2$ and diode $D_2$ is connected in series with capacitor C. Temperature sensor T is connected in parallel with capacitor C. The common connection of the cathode of diode $D_2$, sensor T and capacitor C is connected to the emitter of unijunction transistor UJT. Base 2 of unijunction transistor UJT is connected to circuit point B, and base 1 thereof is connected to the gate of the SCR. Resistor $R_3$ is connected between base 1 of transistor UJT and input terminal 2. The series connection of heating device L and the anode and cathode of the SCR is connected between circuit point A and input terminal 2. The heating device L may, for example, comprise a heating coil or its equivalent.

As conventionally known, an SCR comprises a unidirectionally conductive element. Further, an amount of energy at least equal to the gate threshold energy of the SCR must be applied to its gate during the positive half-cycle of the alternating current power supply applied to its gate during the positive half-cycle of the alternating current power supply applied between its anode and cathode in order to fire the SCR into conduction. An SCR continues to conduct during the remaining portion of the positive half-cycle after it is fired into conduction, even should an amount of energy less than the gate threshold energy be thereafter applied to its gate, and until its anode and cathode are reverse-biased.

The combination of the unijunction transistor trigger circuit and the SCR provides half-wave phase control for heating device L. The gate current applied to the SCR may lead the voltage across its anode and cathode by a maximum of 90°, depending upon the relative values of resistors $R_1$ and $R_2$, sensor-thermistor T and capacitor C. By varying the relative magnitudes of the described resistive and capacitive components, the firing angle (that point during the positive half-cycle at which the SCR fires) and hence the duty cycle of the SCR may be correspondingly varied.

Diode $D_1$ provides half-wave rectification of the applied alternating current power supply. Zener diode $D_3$ functions to clip and regulate the voltage as well as the peaks of the signals developed by the circuit point B and input terminal 2. Resistors $R_1$ and $R_2$, in combination with sensor-thermistor T and capacitor C determine the operating characteristics of the unijunction transistor UJT. More particularly, the relative values of these elements in conjunction with the amplitude of the applied power supply determine the rate of charging of capacitor C and therefore the conduction characteristics of unijunction transistor UJT. When unijunction transistor UJT is driven to conduction, it develops a sufficient voltage across resistor $R_3$ to cause the SCR to fire. Increasing the resistance of variable resistor $R_2$ causes unijunction transistor T to be driven to conduction at a relatively later time, and consequently causes the SCR to fire at a relatively later time during the positive half-cycle of the applied power supply. This decreases the duty cycle of the SCR, and thereby causes heating device L to produce relatively less heat. Minimizing the resistance of variable resistor $R_2$, on the other hand, causes a corresponding increase in the duty cycle of the SCR. Thus, the relative setting of variable resistor $R_2$ together with the temperature sensor T determines the duty cycle of the SCR, and therefore, it may be selectively varied to obtain the selected temperature. Sensor T as shown in FIG. 1 comprises a negative temperature coefficient temperature sensor, and controls operation of the unijunction UJT such that the latter does not cause the SCR to fire when the actual temperature (to which sensor T is responding) reaches or exceeds the selected temperature (as determined by the setting of variable resistor $R_2$). Then, the duty cycle of the SCR is zero, and no heat will be produced at that time by heating device L. Thus varying the resistance of sensor T, in response to the actual temperature produced by heating device L, controls the duty cycle of the SCR as described. As the resistance of the negative temperature coefficient sensor T decreases, it will require a longer time for C, the capacitor in parallel with it, to charge to 14 volts. On the other hand, as the resistance of the thermistor increases, it will require a shorter time for the same capacitor C, in parallel with it, to charge to 14 volts—the approximate intrinsic standoff ratio or necessary voltage to trigger the UJT, for a given 20v. supply.

Obviously, if the temperature sensor T is connected in parallel with variable resistance $R_2$, a positive temperature coefficient can be established to advantage as shown in FIG. 2, but the circuits operate similarly.

If it is assumed that the selected temperature is lower than the actual temperature, the corresponding resistance of temperature sensor T as shown in FIG. 1 will bias transistor UJT to conduction to correspondingly cause SCR to fire at some point during the positive half-cycle. This will cause heating device L to produce a further rise in the actual temperature, thereby causing the resistance of sensor T to decrease in FIG. 1. This will increase in FIG. 2, the effective charging time of capacitor C and consequently unijunction UJT will cause the SCR to fire at a relatively later time during the positive half-cycle and thereby decrease the duty cycle. This procedure will continue until the selected temperature is equal to or exceeds the actual temperature. At that time, the resistance of sensor T will be sufficiently reduced or increased to cause the duty cycle of the SCR to become zero. This condition will exist as long as the actual temperature is below the selected temperature. Summarizing: as the resistance of positive temperature coefficient sensistor T decreases, the capacitor will increase its charge speed and fire the UJT quicker or reach 14 volts to fire the UJT quicker, as aforesaid. If positive temperature coefficient sensistor T increases its resistance, on the other hand, then the charge speed to capacitor C will decrease and it will take longer to reach the required 14 volts trigger requirement.

In essence, the SCR comprises a gate circuit which activates heating device L when it is conducting and deactivates heating device L when it is not conducting. Therefore, the longer the duty cycle of the SCR, the longer the activation of heating device L, and consequently the greater the amount of heat developed by the latter. This the heating control circuit will maintain the actual temperature relatively constant at the selected temperature, especially since the SCR responds rapidly to charges in its gate input.

Of course, an on-off switch and an indicator light may be provided for use with the described control circuit. These are not shown because they are unconventional in the art. Further, a potentiometer may be substituted for variable resistor $R_2$, and as mentioned, a negative temperature coefficient thermistor as outlined or positive temperature coefficient sensor may be used with appropriate changes in the triggering circuit components.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

I claim:

1. A half-wave phase control circuit for a flexible material heating device comprising:
    A. alternating current power supply having first and second output terminals;
    B. heating element connected between said output terminals;
    C. a silicon controlled rectifier having anode, cathode, and gate, the series connection of the heating element and anode-cathode circuit of the silicon controlled rectifier being interconnected between first and second output terminals;
    D. a unijunction transistor having first and second bases, and a control electrode, said unijunction transistor being disposed via its first base through a bias network to gate connection with the silicon controlled rectifier;
    E. first rectifier means connected between one of the first and second output terminals and the second base of the unijunction transistor to apply positive signals only thereto; and
    F. a temperature sensor, having common connection with the control electrode of the unijunction transistor and second rectifier means, a variable resistance and a capacitance, regulating thereby the timing of the unijunction triggering transistor, wherein the variable resistance sensor by specific physical juxtaposition relative to the capacitance, regulates the triggering of the unijunction transistor.

2. The half-wave phase controlled circuit of claim 1 in which the temperature sensor is in series connection with the variable resistance and parallel connection with the capacitance.

3. The half-wave phase controlled circuit of claim 1 in which the temperature sensor is in series connection with the capacitance at one end and has parallel connection at the other end with a variable resistance, the latter being in common connection to the base of the unijunction transistor, with the second.

4. A control circuit as recited in claim 1 further comprising:
    G. a zener diode connected between the said second base and the other of the first and second output terminals.

5. A control circuit as in claim 2 further comprising:
    G. a zener diode connected between the said second base and the other of the first and second output terminals.

6. A control circuit as in claim 3 further comprising:
    G. a zener diode connected between the said second base and the other of the first and second output terminals.

7. The control circuit as recited in claim 1 further comprising second rectifier means polarized to block positive signals present at the common junction from being applied to the variable resistance means interposed between the latter and the common junction.

8. The control circuit as recited in claim 2 further comprising second rectifier means polarized to block positive signals present at the common junction from being applied to the various resistance means interposed between the latter and the common junction.

9. The control circuit as recited in claim 3 further comprising second rectifier means polarized to block positive signals present at the common junction from being applied to the various resistance means interposed between the latter and the common junction.

10. The control circuit as recited in claim 1 wherein the bias network comprises resistance means connected between the first base and the other of the first and second output terminals.

11. The control circuit as recited in claim 2 wherein the bias network comprises resistance means connected between the first base and the other of the first and second output terminals.

12. The control circuit as recited in claim 3 wherein the bias network comprises resistance means connected between the first base and the other of the first and second output terminals.

13. The control circuit of claim 1 in which the variable resistance comprises thermostatic control in coactive connection.

14. The control circuit of claim 2 in which the variable resistance comprises thermostatic control in coactive connection.

15. The control circuit of claim 3 in which the variable resistance comprises thermostatic control in coactive connection.